J. A. NICKOLAUS.
IRRIGATING VALVE.
APPLICATION FILED FEB. 6, 1920.

1,401,097.

Patented Dec. 20, 1921.

WITNESSES

E. A. Buchanan.

INVENTOR
John A. Nickolaus.
BY Munn & Co
ATTORNEYS

UNITED STATES PATENT OFFICE.

JOHN A. NICKOLAUS, OF RICHLAND, WASHINGTON.

IRRIGATING-VALVE.

1,401,097.     Specification of Letters Patent.     Patented Dec. 20, 1921.

Application filed February 6, 1920. Serial No. 356,720.

*To all whom it may concern:*

Be it known that I, JOHN A. NICKOLAUS, a citizen of the United States, and a resident of Richland, in the county of Benton and State of Washington, have invented certain new and useful Improvements in Irrigating-Valves, of which the following is a specification.

My invention relates to irrigating valves used for controlling the emission of water from the pipe lines of irrigating systems.

The purpose of my invention is the provision of an irrigating valve which is so associated with the pipe line as to effect a perfect control of the water irrespective of its pressure in the pipe, and to allow the water to be emitted from the side of the pipe, thus preventing the wind from blowing the water off to the side of the rills while irrigating.

I will describe two forms of valves embodying my invention, and will then point out the novel features thereof in claim.

In the accompanying drawings.

Similar reference characters refer to similar parts in each of the several views.

Figure 1:
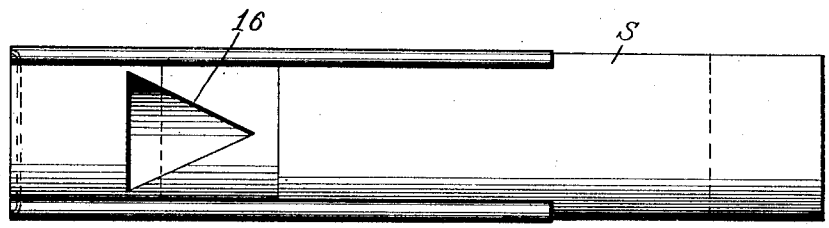
Figure 1 is a view showing in side elevation one form of irrigating valve embodying my invention.
Figures 2, 5:
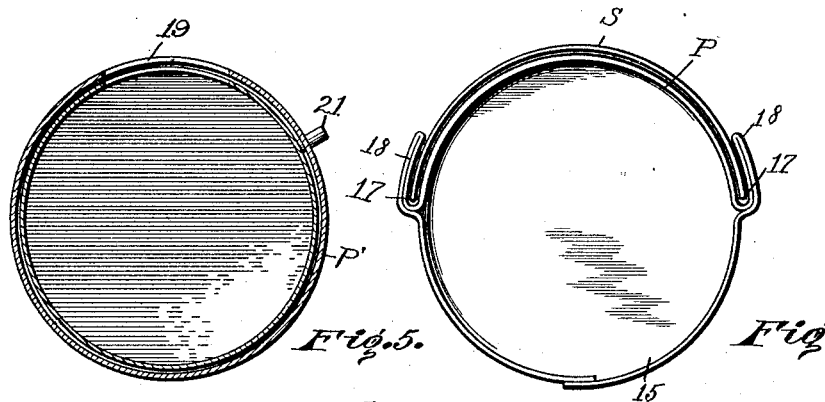
Fig. 2 is a view showing an end elevation of the valve shown in Fig. 1.
Fig. 5 is a transverse sectional view taken on the line 5—5 of Fig. 3.

Referring specifically to the drawings and particularly to Figs. 1 and 2, P designates a pipe closed at its forward end by a wall 15, its rear end being open and adapted to be inserted within the pipe line of an irrigating system. The pipe P is provided adjacent its forward end with a port 16 of triangular formation which is adapted to be controlled by a shutter S slidable in guide channels 17 formed on the pipe P. As shown in Fig. 2, the guide channels 17 are formed by bending portions 18 of the pipe upon themselves and then outwardly and circumferentially so that they are disposed in spaced parallel relation with the periphery of the pipe. The marginal edges of the shutter S are slidably fitted between the portions 18 and the pipe P so that the shutter as a whole is capable of longitudinal sliding movement upon the pipe to effect the control of the port 16.

In the applied position of this irrigating valve, the open end of the pipe is inserted within the pipe line in such manner that the port 16 is disposed at the side of the pipe line. When the shutter S is moved to expose a portion of the port 16, the water in the pipe line is emitted through this port. The amount of water discharged through the port 16 is dependent upon the position of the shutter, it being understood that the port 16 is opened or closed according as the shutter S is moved in one direction or the other, thereby increasing or diminishing at will the amount of water emitted through the port. As the port 16 is disposed at the side of the pipe line, it is obvious that a high wind will not blow the water to the side of the rills while irrigating.

Figure 3:
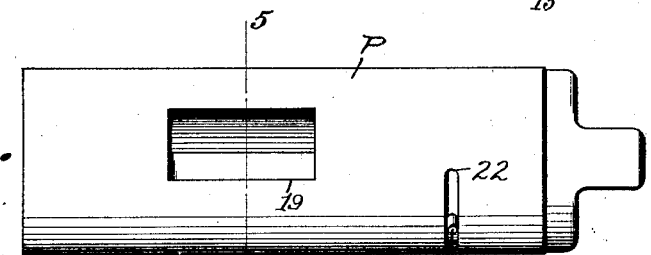
Fig. 3 is a view showing in side elevation another form of irrigating valve embodying my invention.
Figure 4:
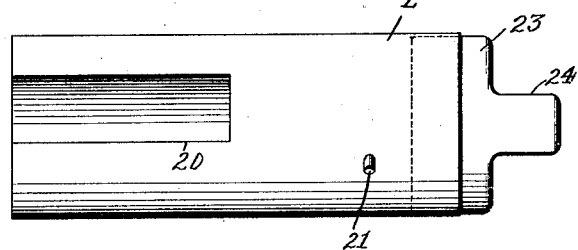
Fig. 4 is a detailed view of the controlling member of the valve shown in Fig. 3.

Referring now to Figs. 3, 4 and 5, I have here shown another form of irrigating valve which comprises a pipe P' formed with a port 19 through which the water from the pipe line is adapted to be emitted. This port 19 is controlled by a sleeve E which is rotatably fitted within the pipe P' and is provided with a port 20 that is adapted to register with the port 19 allowing the discharge of water from the pipe line. The rotary movement of the sleeve E within the pipe P' is controlled by a pin 21 formed on the sleeve, and a slot 22 formed in the pipe P', the pin working within the slot in the manner shown in Fig. 3 so as to restrict the movement of the sleeve in either direction. The pin 21 and the slot 22 are so arranged as to allow the sleeve E to rotate a distance sufficient to cause the port 20 to move into and out of registry with the port 19 and to thereby effect a control of the amount of water discharged through the port 19. The sleeve E is adapted to be manually actuated through the medium of a plug 23 which is snugly fitted within the outer end of the sleeve E and secured thereto in any suitable manner. The plug 23 is provided with a handle 24 which is adapted to be grasped in rotating the sleeve to control the port 19.

In practice, the port 19 is disposed at the side of the pipe line in a manner similar to the port 16 of the first form of valve embodying my invention. This arrangement permits the complete control of the water discharged from the pipe line and prevents the wind from deflecting the stream of water from its natural path.

Although I have herein shown and described only two forms of irrigating valves embodying my invention, it is to be understood that various changes and modifications may be made herein without departing from the spirit of the invention and the spirit and scope of the appended claim.

Having described my invention, what I claim is:

An irrigating valve comprising a sheet metal pipe having a port formed therein, a tubular sheet metal sleeve rotatably fitted within the pipe and having a port adapted to register with the port in said pipe, a pin carried by said sleeve, said pipe being formed with a slot to receive said pin and to thereby restrict the rotational movement of the sleeve, a plug tightly fitted within one end of the sleeve for rotation therewith, and a handle formed on the plug for actuating the sleeve.

JOHN A. NICKOLAUS.